(12) United States Patent
Katada

(10) Patent No.: US 7,213,856 B2
(45) Date of Patent: May 8, 2007

(54) LOAD COLLAPSE PREVENTION DEVICE

(75) Inventor: Naochika Katada, Ikeda (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 10/544,935

(22) PCT Filed: Jan. 29, 2004

(86) PCT No.: PCT/JP2004/000795

§ 371 (c)(1),
(2), (4) Date: May 16, 2006

(87) PCT Pub. No.: WO2004/074045

PCT Pub. Date: Sep. 2, 2004

(65) Prior Publication Data

US 2006/0214447 A1  Sep. 28, 2006

(30) Foreign Application Priority Data

Feb. 21, 2003  (JP) ............................. 2003-045021

(51) Int. Cl.
  *B60R 21/06* (2006.01)
(52) U.S. Cl. .................... 296/24.43; 280/749; 160/265
(58) Field of Classification Search ............. 296/24.43, 296/24.4; 280/749; 160/265
See application file for complete search history.

(56) References Cited

U.S. PATENT DOCUMENTS 5,551,726 A    9/1996   Ament et al.
6,817,644 B2 * 11/2004  Moore ...................... 296/24.43
6,871,894 B2 *  3/2005  Zummack ................ 296/24.43
7,017,965 B2 *  3/2006  Sitzler et al. ............ 296/24.43

FOREIGN PATENT DOCUMENTS

DE    100 08 976 A1    8/2001
DE    102 22 050 A1   11/2003
JP    2000-185600 A    7/2000
JP    2000185600 A  *  7/2000
JP    2003-048487 A    2/2003

* cited by examiner

*Primary Examiner*—Jason Morrow
(74) *Attorney, Agent, or Firm*—Sughrue Mion, PLLC

(57) ABSTRACT

There is provided a load collapse prevention device including a pair of holders (5) fixedly attached to parts of the inner wall of a vehicle compartment, at both ends thereof, in a vehicle-width direction, on the side of the ceiling, respectively, so as to opposite to each other, each having a stopper for engaging a joint, wherein the holders (5) each have a lead-in part (11A, 11B), formed by notching parts of the side faces and lower face of the holder, forming a guide groove wide width part (14), and a guide groove (10) continuing from the lead-in parts (11A, 11B) to the stopper, thereby introducing a stay (2) from the lower part of the holders into the guide groove (10) while the joint is in as-retracted state, then guiding the stay (2) to the stopper. As a result, with load collapse prevention device, the joints can be fitted to the holders, respectively, by one-handed operation, and the respective joints on the right and left sides can be concurrently and easily fitted to the respective holders (5).

3 Claims, 5 Drawing Sheets

LOAD COLLAPSE PREVENTION DEVICE

TECHNICAL FIELD

The invention relates to a load collapse prevention device, and more particularly, to a load collapse prevention device capable of easily carrying out a job for attaching a net thereof to inner parts of a vehicle compartment, on the ceiling side thereof, by one-handed operation.

BACKGROUND TECHNOLOGY

With a vehicle, and so forth that are provided with a luggage room behind occupant seats inside a vehicle compartment, there is the risk of luggage loaded in the luggage room jumping over a seat back to fall onto the occupant seats at the time of, for example, abrupt reduction in speed. In order to solve such a problem, there has been in use a load collapse prevention device for providing a partition between the occupant seats, and the luggage room by extending a net therebetween. As shown in FIG. 4, a conventional load collapse prevention device has a structure in which stays 2, 3, each in the shape of a bar extending in a vehicle-width direction, are joined with upper and lower edges, respectively, of a net 1 of a size large enough to serve as a partition between the occupant seats, and the luggage room, and is used by fitting the stay on the side of the lower edge of the net to a plurality of fittings provided in the rear face of the seat back or the luggage room, and detachably fitting both ends of the stay 2, on the side of the upper edge of the net, to a pair of holders 5 fixedly attached to parts of the inner wall of the vehicle compartment, at both ends thereof, in the vehicle-width direction, on the side of the ceiling, respectively, so as to oppose each other.

A conventional stay 2 and holder 5 are described in detail with reference to FIGS. 5 to 7. A joint 6 is inserted into the both ends of the stay 2, in the vehicle-width direction, so as to be slidable in the vehicle-width direction, against the stay 2, and is urged by a compression coil spring (not shown), in a direction to cause it to protrude outward from the stay 2, in the vehicle-width direction, all the time. A flange 7 in a disc-like shape is formed integrally with a protruding end of the joint 6, and a dimension between respective extremities of the flanges 7, in the vehicle-width direction, in a state where the joint 6 is most protruded from the stay 2, is set so as to be slightly larger than a dimension of a room-width. As a result, even if there occurs some variation in the dimension of the room-width, the joints 6 can be engaged with the holders 5, respectively.

The holder 5 for engaging the joint 6 has an under face 5B pressed onto the inner wall 9 of the vehicle compartment by a bolt (not shown) inserted into a bolt hole 8 to be thereby fixedly attached thereto. The holder 5 is provided with a guide groove 10 resembling the letter T in section, formed for engaging the flange 7. In the guide groove 10, there are formed an upper lead-in part 11A open to an upper face 5A side of the holder 5, a lower lead-in part 11B, and a guide groove ridge 11C to be linked with an R part 11D of a stopper. The upper lead-in part 11A, and the lower lead-in part 11B are formed such that the respective right ends thereof are positioned on the left side of the right end face 5C of the holder 5, and an interval therebetween, in the vertical direction, is slightly larger than a diameter of the flange 7.

The lower lead-in part 11B is gently tilted upward toward the left side (the forward side of the vehicle compartment) to be linked with the right side of the guide groove ridge 11C, and the left side of the guide groove ridge 11C is linked with the lower end of the R part 11D. The upper lead-in part 11A is gently tilted downward toward the left side (the forward side of the vehicle compartment) to be linked with the upper end of the R part 11D. The R part 11D is formed smaller in diameter than the flange 7. Further, in the guide groove 10, there are formed a guide groove upper face 12A, guide groove lower face 12B, guide groove inner face 12C, and guide groove outer face 12E to be linked with an R part 12D of the stopper. The respective right ends of the guide groove upper face 12A, guide groove lower face 12B, and guide groove outer face 12E are open to the right end face 5C of the holder 5. The guide groove upper face 12A, and guide groove lower face 12B are formed such that an interval between the respective right ends thereof, in the vertical direction, is slightly larger than the diameter of the flange 7.

The guide groove lower face 12B is gently tilted upward toward the left side (the forward side of the vehicle compartment) to be linked with the lower end of the R part 12D. The guide groove upper face 12A is gently tilted downward toward the left side (the forward side of the vehicle compartment) to be linked with the upper end of the R part 12D. The R part 12D of the stopper is formed so as to be larger in diameter than the flange 7. A step 13 is formed around the bolt hole 8 of the guide groove outer face 12E, and the bolt hole 8 is covered by putting a blind cover (not shown) with a thickness identical to a height of the step 3, on the step 3, so that the guide groove outer face 12E has no stepped part.

An operation for fitting the stay 2 to the conventional holders 5, described as above, is executed as follows.

Since the dimension between the respective extremities of the flanges 7, in the vehicle-width direction, is set so as to be slightly larger than the dimension of the room-width, the joints 6 are caused to undergo retraction. In this state, the flange 7 is inserted into the guide groove 10 from the side of the right end face 5C of the holder 5 as indicated by an arrow in FIG. 5 (the flange 7 at a position P1). When the stay 2 is pushed in the forward direction of the vehicle compartment, the flange 7 is guided by the guide groove upper face 12A, guide groove lower face 12B, guide groove inner face 12C, and guide groove outer face 12E to thereby cause a head 6A of the joint 6 to ride across the guide groove ridge 11C (the flange 7 at a position P2), whereupon the flange 7, and the head 6A reach the R part 12D, and the R part 11D, respectively, (the flange 7 at a position P3), thereby completing an operation for fitting one of the joints 6. An operation for fitting the other of the joints 6 is executed by repeating the same operation as described above.

Further, there has been known a configuration disclosed in JP-A No. 104074/2002 as Patent Document although the configuration somewhat differs from that for the invention under the present application.

However, the conventional technology described has had shortcomings in that since it is necessary to hold the stay 2 in one hand, and to cause the joints 6 to undergo retraction with the use of the other hand in order to fit the stay 2 into the holders 5, operations with the use of both the hands are required, and the respective joints 6 on the right and left sides cannot be concurrently fitted to the respective holders 5 on the right and left sides, so that an efficient fitting operation cannot be implemented.

The invention has been developed in view of the problem described as above, and it is therefore an object of the invention to form a guide groove for guiding a joint in as-retracted state to a stopper in respective holders to thereby enable the joints to be fitted to the holders, respectively, by one-handed operation, so that the respective joints on the right and left sides can be concurrently fitted to the respective holders with ease.

DISCLOSURE OF THE INVENTION

1. The invention provide in its first aspect a load collapse prevention device comprising a net extendable between the interior of a vehicle compartment, on the side of an interior ceiling, and the rear face of a seat back or the floor face of a luggage room, a stay extending in a vehicle-width direction, and joined with an upper edge of the net, a pair of joints slidably provided at both ends of the stay, in the vehicle-width direction, respectively, and urged in a direction so as to be protruded outward in the vehicle-width direction, and a pair of holders fixedly attached to parts of the inner wall of the vehicle compartment, at both ends thereof, in the vehicle-width direction, on the side of the interior ceiling, respectively, so as to opposite to each other, each having a stopper for engaging the joint, the joints in as-retracted state being engaged with the holders, respectively, characterized in that the respective holders are provided with a guide groove formed in such a way as to enable the joint to be guided to the stopper while retracting the joint.

Consequently, since the guide groove allowing the stay to be inserted therein from below is formed in the respective holders, the operation for fitting the stay can be easily executed without particular consciousness of a direction in which the guide groove runs.

2. With the load collapse prevention device according to the invention as referred to under item (1) as above, the same is a load collapse prevention device in which the guide groove comprises the lead-in parts for the joint and a guide part continuing from the lead-in parts to the stopper, formed by notching parts of the side faces and lower face of the holder, the joint being guided up to the stopper through the guide groove.

As a result, since the guide groove into which the stay is inserted from below is formed in such a way as to be exposed to the inner face of the holder, the joint of the stay can be brought into direct contact with the guide groove to be thereby retracted, so that it is possible to cause the respective joints on the right and left sides to be concurrently fitted into the holder.

3. With the load collapse prevention device according to the invention as referred to under item (2) as above, the holders are fixedly attached to the inner wall of the vehicle compartment, tilted toward the inner side so as to become narrower upward in the vehicle compartment, and the lead-in parts for the joint are provided on the lower side in the vehicle compartment to thereby guide the respective joints upward.

As a result, without providing the guide groove of the holder with particular tilt, the joint can be guided by the guide groove to be thereby retracted, so that the holder has a configuration that is simple, and useful in terms of cost.

BEST MODE FOR CARRYING OUT THE INVENTION

Figure 1:
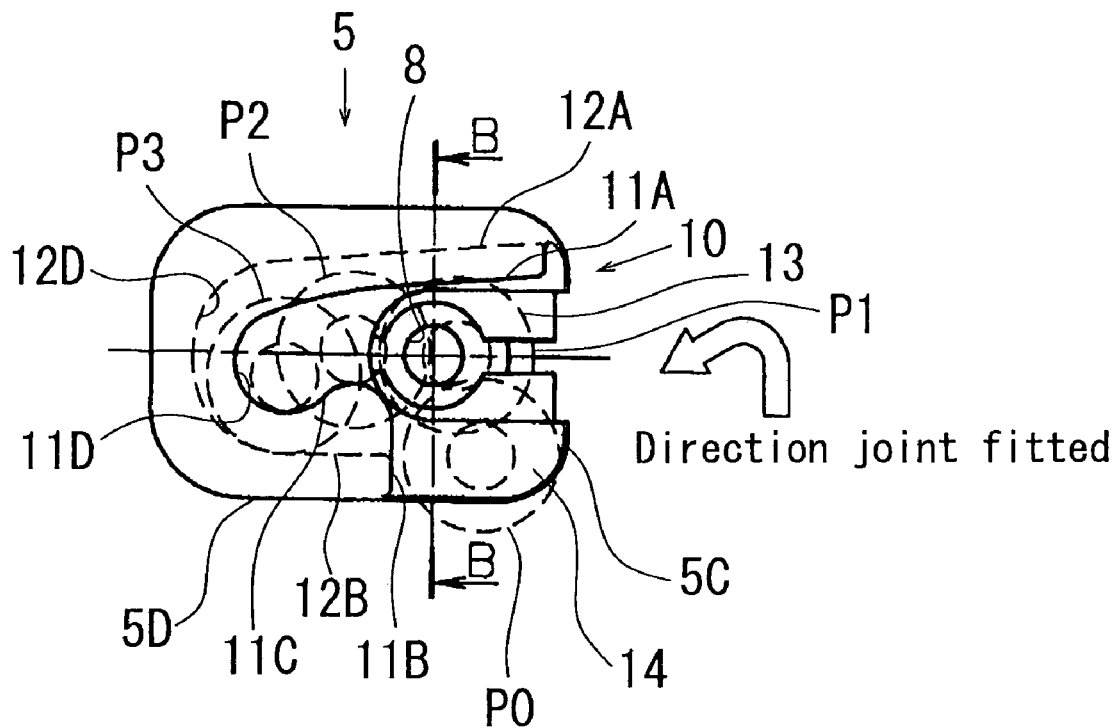
FIG. 1 is a front view of a holder of a load collapse prevention device according to one embodiment of the invention.

An embodiment of the invention is described hereinafter with reference to the accompanying drawings, and in the figures, parts corresponding to those for the conventional load collapse prevention device are denoted by like reference numerals.

Figure 2:
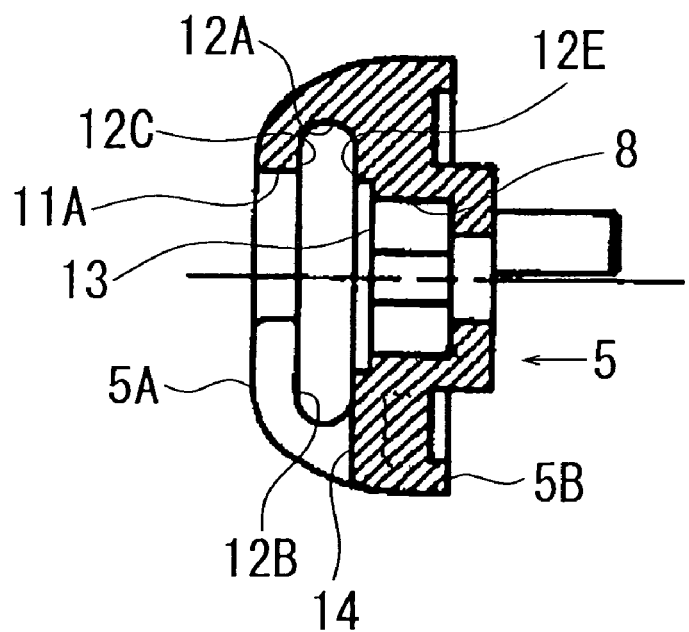
FIG. 2 is a sectional view taken on line B—B in FIG. 1.
Figure 3:
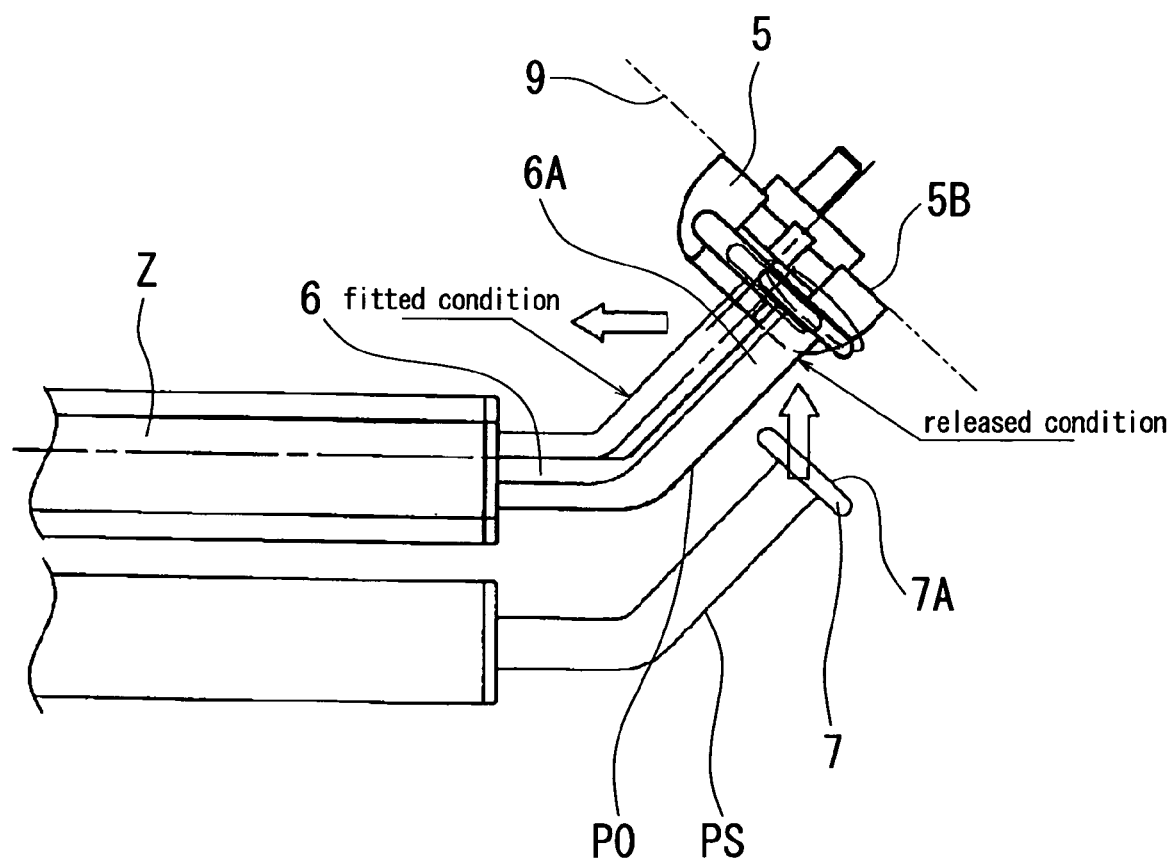
FIG. 3 is a schematic illustration showing an operation for fitting one of joints of the load collapse prevention device to the holder.
Figure 4:
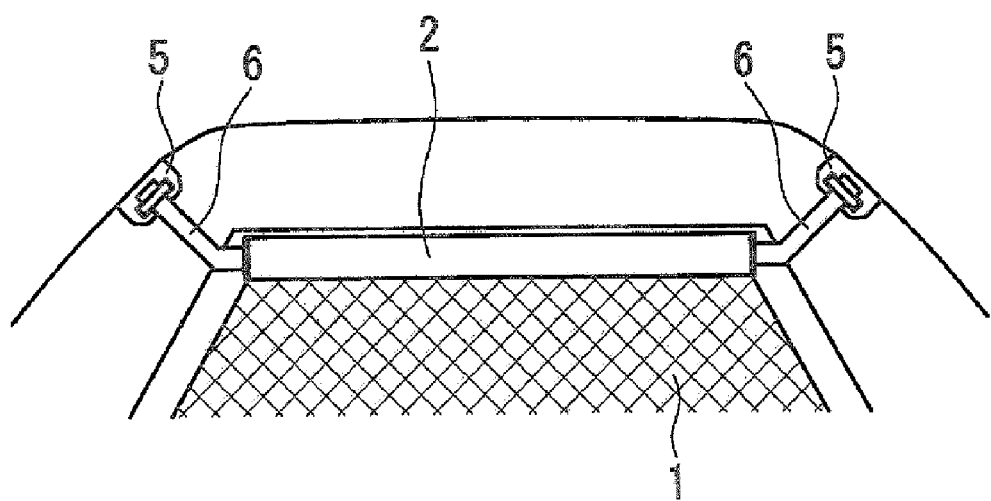
FIG. 4 is a schematic view of a conventional load collapse prevention device as fitted to the interior of a vehicle compartment.
Figure 5:
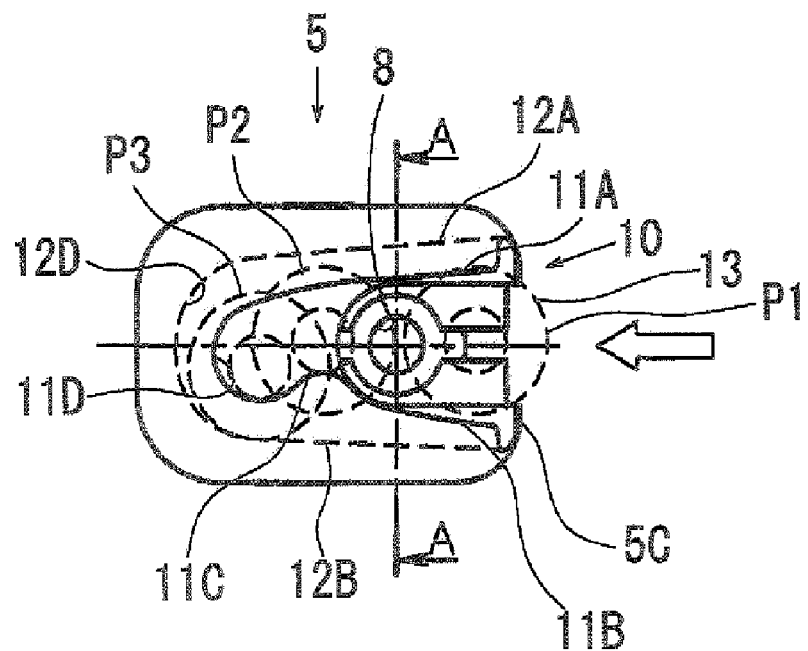
FIG. 5 is a front view of a holder of the conventional load collapse prevention device.
Figure 6:
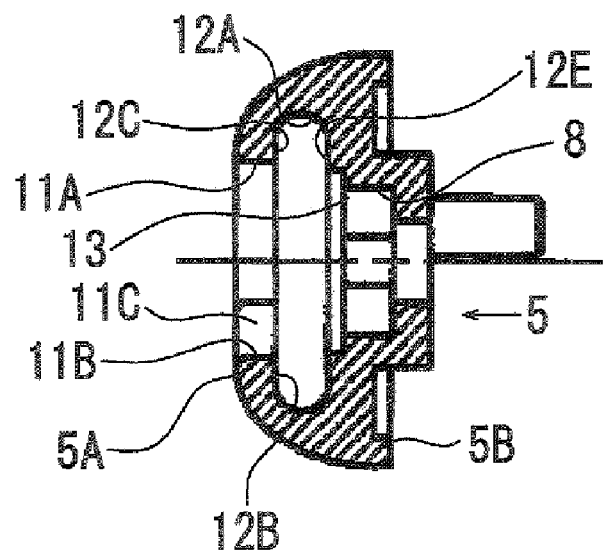
FIG. 6 is a sectional view taken on line A—A in FIG. 5.
Figure 7:
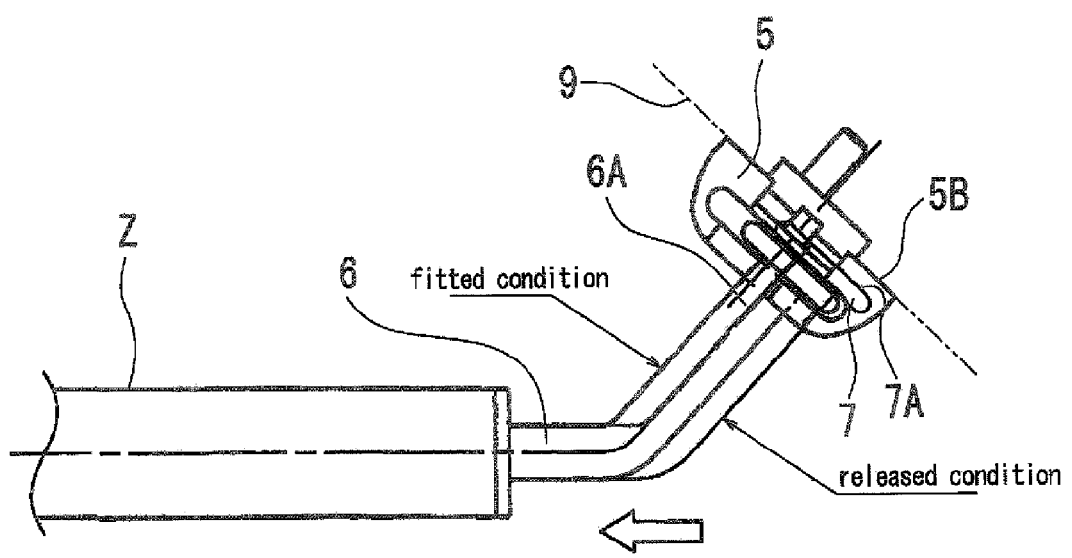
FIG. 7 is a schematic illustration showing an operation for fitting one of joints of the conventional load collapse prevention device to the holder.

FIG. 1 is a front view of a holder 5 according to the invention, FIG. 2 is a sectional view taken on line B—B in FIG. 1, and FIG. 3 is a schematic illustration showing an operation for fitting one of joints 6 to the holder 5.

The holder 5 for engaging each of the joints 6 has an under face 5B pressed onto the inner wall 9 of a vehicle compartment by a bolt (not shown) inserted into a bolt hole 8 to be thereby fixedly attached thereto. The inner wall 9 of the vehicle compartment is tilted in a downward direction from above in the vehicle compartment so as to expand outward along a vehicle-width direction. The holder 5 is provided with a guide groove 10 resembling the letter T in section, formed for engaging a flange 7. In the guide groove 10, there are formed an upper lead-in part 11A open to an upper face 5A of the holder 5, a lower lead-in part 11B, and a guide groove ridge 11C to be linked with an R part 11D of a stopper. The right end of the upper lead-in part 11A is positioned slightly on the left side of the right end face 5C of the holder 5, and the lower lead-in part 11B is extended straight downward from the right end of the guide groove ridge 11C, so that the lower end thereof are open to a lower end face 5D of the holder 5. The left end of the guide groove ridge 11C is linked with the lower end of the R part 11D. The upper lead-in part 11A is gently tilted downward toward the left side (the forward side of the vehicle compartment) to be linked with the upper end of the R part 11D. The R part 11D is formed smaller in diameter than the flange 7. Further, in the guide groove 10, there are formed a guide groove upper face 12A, guide groove lower face 12B, guide groove inner face 12C, and guide groove outer face 12E to be linked with an R part 12D of the stopper. The respective right ends of the guide groove upper face 12A, on a side adjacent to the upper lead-in part 11A, and the guide groove outer face 12E each are open to the right end face 5C of the holder 5.

The guide groove lower face 12B is has the right end thereof that is open to the lower lead-in part 11B, and is gently tilted upward from the lower lead-in part 11B toward the left side (the forward side of the vehicle compartment) to be linked with the lower end of the R part 12D. The guide groove upper face 12A is gently tilted downward toward the left side (the forward side of the vehicle compartment) to be linked with the upper end of the R part 12D. The R part 12D of the stopper is formed so as to be larger in diameter than the flange 7. A step 13 is formed around the bolt hole 8 of the guide groove outer face 12E, and the bolt hole 8 is covered by putting a blind cover (not shown) with a thickness identical to a height of the step 3, on the step 3, so that the guide groove outer face 12E has no stepped part. On the right side of the lower lead-in part 11B, there is formed a guide groove wide width part 14 with a width, in a lateral direction (the longitudinal direction of the vehicle compartment), larger than the diameter of the flange 7. The guide groove wide width part 14 is open to the right end face 5C and lower end face 5D of the holder 5, and is formed on the same plane where the guide groove outer face 12E is formed. Because a wide space is secured around the bolt hole 8 by the guide groove wide width part 14, insertion of the bolt into the bolt hole 8 can be easily executed, so that an operation for attaching the holders 5 to the inner wall 9 of the vehicle compartment can be executed with ease.

An operation for fitting the stay 2 to the holders 5 according to the invention is executed as follows. As indicated by arrows in FIGS. 1, and 3, the stay 2 is brought close to the respective holders 5, on the right and left sides, from the downward direction in the vehicle compartment (the flange 7 at a position PS) toward the upward direction in the vehicle compartment. With an end face 7A of the flange 7 being kept in a such state as butted against the guide groove wide width parts 14 of the respective holders 5, on the right and left sides (the flange 7 at a position PO), the stay 2 is brought up in the upward direction in the vehicle compartment, whereupon the end face 7A of the flange 7 is guided to the guide groove wide width parts 14, and the lower lead-in parts 11B, and the stay 2 is moved along the respective guide groove wide width parts 14 while retracting the respective joints 6 since the stay is fitted to an inclined wall becoming narrower upward in the vehicle compartment.

After the upper side of the flange 7 reaching the guide groove outer face 12E on a side adjacent to the upper lead-in part 11A (FIG. 1: the flange 7 at a position P1), the stay 2 is moved in the forward direction in the vehicle compartment, whereupon the flange 7 is guided by the guide groove upper face 12A, guide groove lower face 12B, guide groove inner face 12C, and guide groove outer face 12E, along the guide groove, to thereby smoothly move in the forward direction of the vehicle compartment while a head 6A of the joint 6 is caused to ride across the guide groove ridge 11C (the flange 7 at a position P2), so that the flange 7, and the head 6A reach the R part 12D, and the R part 11D of the stopper, respectively, (the flange 7 at a position P3) to be engaged with the stopper, thereby completing the operation for concurrently fitting the respective joints 6 on the right and left sides.

The embodiment described as above has been described by taking the case of installing the load collapse prevention device inside the vehicle compartment of an automobile as an example, however, it is to be pointed out that application of the load collapse prevention device according to the invention is not limited thereto, but the same can be installed in a cargo room of any cargo carrying means including ships or aircraft.

INDUSTRIAL APPLICABILITY

The load collapse prevention device according to the invention is useful as apparatus for prevention of load collapsing in a luggage room of an automobile, ship, or aircraft, and so forth.

The invention claimed is:

1. A load collapse prevention device comprising:
   a net extendable between the interior of a vehicle compartment, on the side of an interior ceiling, and the rear face of a seat back or the floor face of a luggage room;
   a stay extending in a vehicle-width direction, and joined with an upper edge of the net,
   a pair of joints slidably provided at both ends of the stay, in the vehicle-width direction, respectively, and urged in a direction so as to be protruded outward in the vehicle-width direction; and a
   pair of holders fixedly attached to parts of the inner wall of the vehicle compartment, at both ends thereof, in the vehicle-width direction, on the side of the interior ceiling, respectively, so as to opposite to each other, each having a stopper for engaging the joint, the joints in as-retracted state being engaged with the holders, respectively;
   wherein the respective holders are provided with a guide groove including an opening facing downward so as to enable the joint to be fitted thereto from below, and said guide groove guides, the joint to the stopper while retracting the joint.

2. A load collapse prevention device according to claim 1, wherein the guide groove comprises the-lead-in parts for the joint and a guide part continuing from the lead-in parts to the stopper, formed by notching pans of side faces and a lower face of the holder, the joint being guided up to the stopper through the guide groove.

3. A load collapse prevention device according to claim 2, wherein the holders are fixedly attached to an inner wall of the vehicle compartment, tilted toward the inner side so as to become narrower upward in the vehicle compartment, and the lead-in parts for the joint are provided on the lower side in the vehicle compartment to thereby guide the respective joints upward.

* * * * *